Jan. 6, 1948.          C. FARROW          2,434,203
METHOD AND APPARATUS FOR MAGNETIC TESTING
Filed Sept. 22, 1943
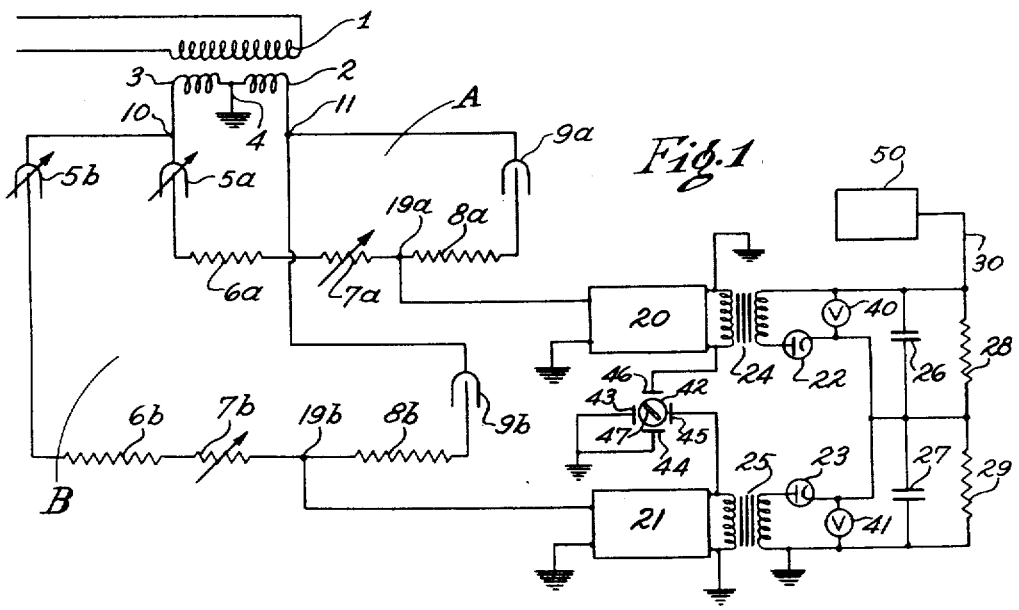
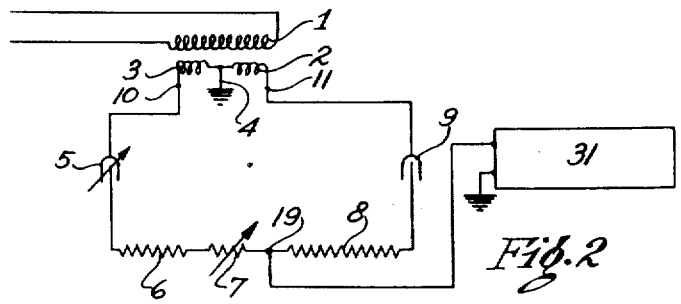
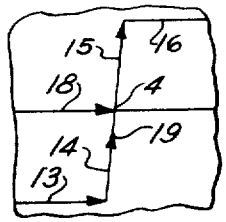
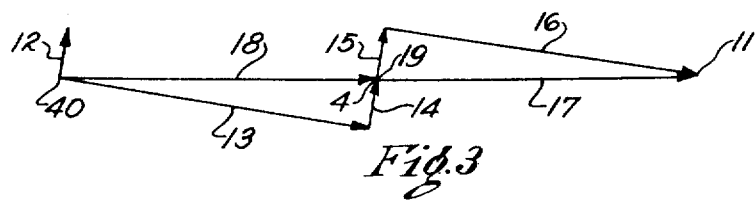
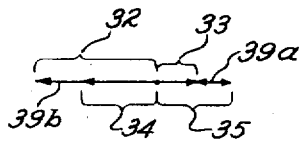
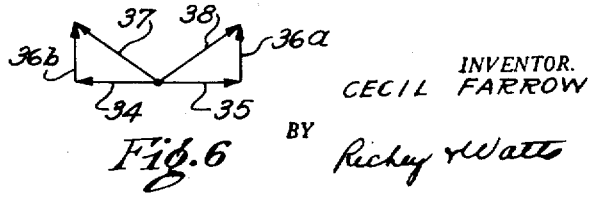
INVENTOR.
CECIL FARROW
BY Richey & Watts
ATTORNEYS Patented Jan. 6, 1948

2,434,203

UNITED STATES PATENT OFFICE 2,434,203

METHOD AND APPARATUS FOR MAGNETIC TESTING

Cecil Farrow, Bainbridge Township, Geauga County, Ohio, assignor to Republic Steel Corporation, Cleveland, Ohio, a corporation of New Jersey Application September 22, 1943, Serial No. 503,408

10 Claims. (Cl. 175—183)

This invention relates to apparatus for non-destructive testing of metal articles and more particularly to a method and apparatus for controlling the currents generated in the pickup coils. It constitutes an improvement in the apparatus as illustrated in my copending application of June 13, 1942, Serial No. 446,907, now Patent No. 2,415,789 and United States Reissue Patent No. 21,003 of February 13, 1939, to Horace C. Knerr and Cecil Farrow.

As illustrated in the patent and application it has become the practice to use an alternating current signal to energize a primary coil, this signal is picked up by pickup coils disposed in the induction field of the primary coil. The pickup of the signal is effected by the metal article under test and the effect on the signal by the article (particularly phase shift) is utilized to determine the presence or absence of undesirable defects in the article.

In devices of this character it is sometimes desirable to obtain a balance between the currents in the pickup coils or in some cases to attain a certain degree of unbalance in the currents in the pickup coils to facilitate the determination of the presence of changes in the currents and voltages in the coils. By the present method and apparatus of my invention the obtaining of the desired current condition or balance may be readily effected.

It is therefore an object of this invention to provide an improvement in circuits for non-destructive testing of metal articles.

It is another object of my invention to provide an improved balancing circuit for the pickup portion of a non-destructive testing circuit.

Another object of the invention is to provide a circuit wherein the passage of the article under test will effect the circuit so that undesirable defects may be located.

Another object of my invention is to provide a circuit wherein certain components may be unbalanced and the passage of an article under test near the circuit will cause the balance of the circuit to be changed to provide either a greater or lesser degree of unbalance as may be desired.

It is another object of my invention to provide a circuit which may be adjusted to provide a balance or unbalance in either direction and wherein changes in current flow due to conditions other than undesirable defects will not affect the circuit.

Another object of my invention is to provide a pickup circuit for non-destructive testing where certain components of the circuit may be unbalanced and wherein, upon the passage of a defective article under test at or near the circuit, one part of the circuit is caused to attain a greater degree of unbalance and the other part a lesser degree of unbalance.

Another object of the invention is to enable the foregoing objects to be attained and still not have the circuit affected by changes in the current and voltages which are not necessarily due to undesired defects.

Still other objects of the invention will become more apparent from the following description of an embodiment of my invention which is illustrated by the accompanying drawings and which forms a part of this specification.

In the drawings:

Fig. 1 is a diagram of a circuit useful in non-destructive testing and embodying the principles of my invention;

Fig. 2 is a diagram of a part of the circuit of Fig. 1 to illustrate the principles of the invention;

Figs. 3 to 6, inclusive, are vector diagrams to show the theory of operation of the circuit.

Throughout the drawings like parts have been designated by like reference characters.

In Fig. 1, the primary coil 1 is energized by a source of alternating current, not shown, which may be of any desired frequency. Disposed in inductive relation to the coil 1 is a pair of secondary coils 3—2 which are connected in series to each other and grounded at 4. These coils are adapted to have conducting articles passed in inductive relationship to them for the purpose of testing such articles. Coils 2 and 3 may be mounted coaxially or otherwise in such a position as to compare one part of an article with another part of the same article. Likewise coil 1 may be divided into two parts with coil 2 associated with one part and coil 3 associated with the other part. These variations are well known in the art of non-destructive testing. In series with the coils 3—2 and in parallel with each other are two similar discrete branch circuits A and B connected to the coils at 10 and 11. Each circuit comprises variable condensers 5a or 5b, fixed resistances 6a or 6b, variable resistances 7a or 7b, fixed resistances 8a or 8b, and fixed condensers 9a or 9b, the "a" series of elements being in connection in one circuit and the "b" series in the other, these of each circuit being connected in series in the order named and in series with the coils 3—2. Each of the circuits is tapped at 19a and 19b respectively to form bridge circuits and connected at their taps to separate amplifiers 20 and 21 which are for amplifying the signals in the bridge circuits A and B respectively.

Circuit elements may be changed around to some extent. Thus, resistor 8a and condenser 9a may be interchanged since they are completely contained within one branch of the circuit and impedance between point 11 and 19a would not be affected by this interchange. Likewise resistance 6a and 7a may be incorporated into one unit. Other changes of a similar nature may be made. Likewise, condensers and resistors in the respective branches may be in parallel instead of in series.

The output of amplifier 20 is connected by the transformer 24 to the rectifier 22. Likewise the output from amplifier 21 is connected by the transformer 25 to the rectifier 23. The output from the rectifier 22 is applied across the condenser 26 and load resistor 28 which are connected in parallel; and the output from rectifier 23 is applied across the condenser 27 and load resistor 29 which are likewise connected in parallel, and the D. C. voltages developed in such circuit are in opposition to each other which is effected by connecting the cathode ends of the resistors 28 and 29 together to form a summation circuit. The plate end of the resistor 29 is grounded and the output from the combination is taken by the lead 30 from the plate end of resistor 28 and connects to a suitable current operating detecting mechanism at 50 which may provide a visual indication or be a relay or other current operated device. Voltmeters 40 and 41 are provided, each being connected between the cathode and the end of the secondary opposite the anode connection of each of the tubes 22 and 23 for the purpose of determining the rectified output of each circuit and the adjustment of the circuits.

To more clearly understand the operation of the circuit, reference is had to Fig. 2 wherein the primary coil 1 is shown inductively coupled to the secondary or pickup coils 3—2 which are serially connected and their junction grounded at 4. The remainder of the circuit connected to the ends of the coils 3 and 2 constitutes elements placed in series with the coils and which comprise the variable condenser 5, fixed resistance 6, variable resistances 7, fixed resistances 8 and fixed condenser 9, the circuit being tapped at 19 and connected to a detector circuit 31 which may include an amplifier such as 20 or 21. It will thus be seen that this circuit constitutes one of the circuits mentioned in connection with Fig. 1.

In operation, an article to be tested for defects is passed through or near the coils 2—3 which may be spaced apart. The presence of defects that are undesirable causes a shift in the phase of the voltage in coils 2 or 3 depending upon which coil is nearest the defect. Likewise, there may be certain other changes in the voltage induced in the secondary coils due to structural differences in the article under test which may not necessarily be caused by undesired defects. The problem therefore is to differentiate between the effects upon the circuit and to detect changes in the currents or voltages in the circuit which are the result of the undesirable defects.

How this is effected is best understood by a consideration of the operation of the circuit of Fig. 2.

To begin with a voltage is generated in each of the coils 3 and 2, since the circuit is a series closed circuit this voltage generation is accompanied by a current flow which may be best understood by reference to Fig. 3 which is a vector diagram of the conditions as they exist in the circuit when it is balanced as later described.

Since the circuit is a series circuit, the current vector 12 is used as the reference line, the voltage across the coils 3 and 2 is represented by the voltage vectors 18 and 17, lagging the current by slightly less than 90 degrees, and being in series, they add.

The condensers 5 and 9 may be selected so that their reactance is approximately ten times the total resistance of the resistances 6, 7 and 8. The voltage drop across the condenser 5 is 90 degrees behind the current as indicated by the vector 13. Next comes the voltage drop across the resistors 6 and 7 which is in phase with the current and is represented by the vector 14. The voltage drop across resistor 8 is also in phase with the current and is represented by the vector 15 then finally comes the last voltage drop across the condenser 9 which is 90 degrees behind the current and is represented by the vector 16. Since the voltage rises equal the voltage drops, the drops represented by the vectors 13, 14, 15 and 16 meet the end of the rises indicated by vectors 18 and 17.

At this point it should be noted that if the voltages induced in coils 3 and 2 are equal and also the voltage drops across 8 and 9 equal those across 6, 7 and 5 that points 4 and 19 are both at ground potential. In the vector diagram and the circuit, points 10 and 11 indicate the points of greatest potential difference and likewise 4 and 19 represent the points of least or no potential difference.

This represents a condition of balance which may be attained in both circuits A and B when in each circuit the reactance and resistance are adjusted by the adjustable condenser 5 and resistor 7, to make 5, 6 and 7 equal 8 and 9. Also it will be seen that the circuit can be unbalanced if desired by changing either the variable capacity or resistance.

For example if the resistance of 7 is decreased the voltage drop across it will also decrease and this will cause a difference of potential between the points 19 and 4 because, as is shown in Fig. 4, which is an enlarged view of the central part of Fig. 3, the vector 14 is shortened (less voltage drop) which moves the point 19, the point 4 being at ground and remaining fixed, so that a potential difference exists between 19 and 4. The variation of the resistance in this instance is small enough so that the various angles will not be noticeably affected.

In a similar manner the condenser 5 could be varied to shorten or lengthen the vector 13 which would move the point 19 to the left or right along the line of vectors 17—18. Thus the circuit as shown in Fig. 2 can be used to either correct a small unbalance between the coils 2—3 or to cause a small unbalance, when desired, in the complete circuit.

In the case of Fig. 2 the detector circuit may be any circuit which is capable of indicating a difference of potential between the point 19 and ground 4.

Returning again to Fig. 1 it will be seen that it comprises two circuits A and B each of which is like Fig. 2 but that the coils 2 and 3 are common to each circuit.

One method of operation contemplates that the part A of the circuit be unbalanced in one direction and the part B unbalanced in the other direction. That is, the variable resistance 7a in circuit A may be increased so that total resistance of 6a and 7a is greater than 8a, and in part B the variable resistances in 7b may be reduced so that the total resistance of 6b and 7b is less than 8b. This has the effect in one instance of shortening the vector 14 and in the other of lengthening it.

In this case the unbalance in part A is such that the passage of an article having a defect near coil 2 will tend to cause the circuit to approach balance thus decreasing the potential between points 19a and 4; while the unbalance in part B is such that the same defect will tend to increase the potential between points 19b and 4.

This condition is best illustrated in Fig. 5 where the vector 35 indicates the potential difference between the points 19a and 4 and the vector 34 indicates the potential difference between points 19b and 4 before the defect is near the coil. When the defect arrives at the coil the change will be to reduce the potential difference as indicated by vector 39a for the A part of the circuit giving a resultant vector 33 while in the B part of the circuit the potential difference increases an indicated by the vector 39b to give the resultant vector 32. It will therefore be seen that if the potentials between points 19a and 4 and 19b and 4 respectively are amplified by the amplifiers 20 and 21 and then rectified, as shown in Fig. 1, a defect will be shown by the difference in the rectified voltages.

On the other hand the passage of a harmless variable in the article under test does not change the balance existing in Fig. 1 because the harmless variable (usually a magnetic change) merely increases or decreases the voltage in A and B by equal amounts maintaining the same condition of balance.

This is more clearly shown in Fig. 6 where 34 and 35 are again the same vectors previously described in Fig. 5. An increase in voltages in the coil 2 would merely be at right angles to 34 and 35 producing 36a and 36b and giving the resultant vectors 37 and 38 which will still maintain a balance, that is, the potential difference between 19a and 4 will be as shown by resultant 38 while the potential difference between points 19b and 4 will be as shown by resultant 37. In this case no output will occur at lead 30.

It will therefore be seen that I have provided an improved circuit which may be adjusted to provide for differences in the constants of the pickup coils. Also the circuit may be adjusted so that a predetermined amount of unbalance in each part of the circuit may be realized. This unbalanced condition in the two parts of the circuit being in equal and opposite directions when combined in the entire circuit results in a balance, and that for changes due to undesired defects the two parts of the circuit change their degree of unbalance so that one part becomes more nearly balanced while the other part becomes more unbalanced thus providing an overall unbalance which may be detected. Also it has been shown how the effect on the circuit caused by variations in the analysis of the tube which variations are not necessarily undesired defects, have little or no effect on the circuit.

The reaction to defects as described applies in general to actual discontinuities such as non-metallic inclusions, seams, cracks, etc. It may be desirable in some testing to make the apparatus sensitive to variations in hardness, heat treating, etc., in which case the unbalance may well be produced by adjusting condensers 5a and 5b. In some cases the entire adjustment may be made with just resistors 7a and 7b or with just condensers 5a and 5b. The suggested procedure is to balance both branch circuits as shown by zero readings at voltmeters 40 and 41. Then unbalance one circuit such as circuit A in such a manner that a known defect will cause a decrease in the voltage indicated at voltmeter 40 when the defect is in or near coil 3. Then a typical harmless variable, which may be simulated by a small piece of soft iron or preferably of a material composed of small iron particles bonded together by an insulating bonding material, may be inserted in or placed near coil 3 in place of the defect. Voltage shown at voltmeter 40 should then increase slightly. Resistor 7b should then be adjusted in an opposite sense to the adjustment made in resistor 7a and condenser 5b adjusted in the opposite sense to the adjustment made in condenser 5a. The magnitude of these adjustments should be comparable to those made in elements 6a and 5a respectively. The exact amounts will be determined by the condition that with no defect present, the voltage across resistor 28 should cancel that across resistor 29. The final adjustment should be such that the typical harmless variable will not cause any decrease in the reading of either meter 40 or 41 as it approaches either of the coils 2 or 3 and upon closer approach it will cause equal increase in both readings.

A cathode ray oscillograph, shown diagrammatically at 42 in Fig. 1 may be used to facilitate adjustment. Vertical deflection plate 44 and horizontal deflection plate 43 may be grounded as shown. The vertical deflection may be produced by putting the output voltage of amplifier 20 between vertical deflection plates 46 and 44. The horizontal deflection may be produced by putting the output voltage of amplifier 21 between horizontal deflection plates 43 and 45. When connected as shown, proper adjustment of the balancing circuits may be indicated by a straight line trace tilted approximately at 45 degrees as shown at 47. Whether tilted to right or left may depend upon polarity of connections. The presence of a typical harmless variation in or near the test coils should cause this trace to open into an ellipse and increase in length without any change in the angle of its major axis from the original angle of the straight line trace. The presence of a defect should cause the straight line to change its angle of inclination, possibly with some opening into an elliptical shape.

The entire oscillograph tube may be rotated about its axis until the trace 47 is either vertical or horizontal to make it easier to determine if any change of angle of the major axis of the trace occurs.

The above discussion of the adjustment of the circuit deals with ideal conditions and is intended as a guide. Those skilled in the art will understand that some experimentation will be required to determine the best set up procedure for each case and also that seldom will harmless variable and defects produce voltages exactly 90 degrees out of phase as indicated in the vector diagrams of Figs. 5 and 6. Nevertheless, the apparatus shown and its use as described provides improved means and method of conducting nondestructive tests of conducting articles.

Although I have shown and described the reactive components of the circuit as being capacitance, I also contemplate substituting inductive reactance therefor which will afford me substantially the same results.

Having thus described my invention and a method of operating the same, I am aware that numerous and extension departures may be made therefrom without departing from the spirit or scope thereof.

I claim:

1. A circuit for non-destructive testing which comprises a primary signal circuit for generating a signal, a secondary circuit for picking up said signal and including a pair of serially connected pickup coils adapted to have an article being tested passed through or near them to affect the picked up signal and having a common terminal, the electrical potential of which is referred to for reference as zero-potential, a pair of parallel branch circuits each connected in series with the signal coils and including resistive and reactive elements with an output terminal at an intermediate point in the circuit, means for relatively adjusting the impedances of said elements for normally producing zero-potential at the output terminal, output connections for each of said parallel circuits between the said zero potential coil terminal and said output terminals, and means connected to said output connections to measure a change from zero potential difference upon a change in phase of said signal in the pickup coils.

2. A circuit for non-destructive testing of metal articles including a primary circuit in which a signal is generated, a secondary circuit adapted to have a test article brought into inductive relation thereto and electrically coupled to said primary circuit for picking up signals from the primary circuit and including a pair of like branch circuits each including reactive and non-reactive elements, separate output terminals for each of said branch circuits, said elements including adjustable elements which are adjustable to predetermine the normal potential of said output terminals and said reactive portions of said circuits being sensitive to phase changes in the circuit to change the normal potential and means connected to said output terminals to detect potential changes upon bringing a test article into inductive relation to said secondary circuit.

3. A testing circuit including a signal generating circuit and a signal pickup circuit coupled thereto, said signal pickup circuit including a pair of inductive reactances connected in series and grounded at their point of connection and a pair of branch circuits each including capacitive reactances, one of which is adjustable, each connected to one of said inductive reactances, non-reactive resistances, at least one of which is adjustable, connected to each of said capacitive reactances and to each other and output connections for said branch circuits at the ground and between said resistances, said adjustable elements being adjustable to enable one side of each branch circuit between the output connections to be balanced against the other side between the output connections to provide zero difference in potential between the output connections in each branch circuit, and means responsive to difference of potential between the ungrounded output connections of said branch circuits.

4. A circuit for testing for defects in elongated metallic articles which includes a primary circuit in which a signal is generated, a secondary circuit inductively coupled to the primary circuit for having signals induced therein from the primary circuit comprising a pair of pickup elements adapted to have the articles passed near or through them to affect the signal induced therein, a pair of subsidiary circuits connected to said pickup elements each of which said subsidiary circuits includes reactive elements and non-reactive impedance elements, each of said subsidiary circuits having an output terminal at an intermediate point in the circuit, said subsidiary circuits each having one of the impedance elements therein adjustable to vary an impedance component to enable adjustment of the signal potential at said output terminals and permit the circuits to be adjusted to provide no signal output or to provide a signal output and means connected to the output terminals of said subsidiary circuits to detect changes in relative signal outputs of between the subsidiary circuits responsive to the effect of presence of defects in the articles being tested.

5. Apparatus for non-destructive testing of metal articles for defects, including a pair of pickup coils adapted to be placed in the vicinity of an article to be tested connected in series to each other and having a common terminal grounded therebetween, a pair of serially connected branch circuits connected in parallel to each other and in series with said pickup coils and each comprising reactance and resistance in series with said pickup coils and having a terminal at an intermediate point dividing the branch circuit into parts, each having reactive and resistive components, and means to adjust the reactance and resistance to provide a desired degree of unbalance in each of said pair of branch circuits, one of said circuits adapted to be unbalanced in one direction and the other in the opposite direction so that the presence of a defect causes one circuit to increase its unbalance and the other to decrease the unbalance and means to detect the change of unbalance.

6. An apparatus for non-destructive testing of metal articles which comprises a signal generating circuit, pickup means electrically coupled to said signal generating circuit and including a pair of circuits each adapted to receive said signals, each having parts acting in opposition to other parts, and containing reactive and non-reactive components adapted to be unbalanced in opposite directions and each having output terminals and means for connecting the output terminals in opposition to provide a balance between the circuits normally, said pickup means adapted to have the article under test passed in proximity thereto and said reactive and said non-reactive components of said circuits adapted to be affected by changes in signals due to the presence of defects in said articles to increase the degree of unbalance in the one circuit and decrease the degree of unbalance in the other circuit to cause an overall unbalance between the circuits and means to detect the latter unbalance.

7. Apparatus for non-destructive testing of articles including a primary circuit for generating signals, a secondary circuit electrically coupled thereto for picking up said signals including a pair of pickup coils connected in series with a common terminal and adapted to have an article to be tested passed in proximity thereto and a pair of branch circuits connected in parallel to each other and in series with said pickup coils, whereby each of said branch circuits forms a bridge circuit with said pickup coils, each branch circuit having pairs of reactive and non-reactive elements on either side of a junction terminal, to provide reactive and nonreactive components in the bridge and said reactive and nonreactive components being adjustable in at least one leg of each of the bridge circuits to enable a predetermined degree of balance to be obtained, and means connected to the terminals of said bridge circuits to indicate the degree of balance, said reactive components of said bridge circuit being sensitive to phase shift to change the degree of balance upon a shift in phase in said signal.

8. Apparatus for non-destructive testing of metallic articles comprising a signal generating circuit including a primary circuit, a pickup circuit inductively coupled to said primary circuit and including a pair of serially connected secondary coils adapted to have an article under test to be placed in proximity thereto to affect the pickup of signal in said coils, a pair of discrete circuits each connected to the high potential ends of said coils and in parallel to each other, the point of serial connection of said coils being grounded, each of said circuits having capacity and resistance elements on either side of a junction terminal whereby it constitutes together with said secondary coils a bridge circuit comprising serially connected inductance, capacity and resistance on each side of the bridge, said capacity and resistance in at least one side of the bridge being adjustable to bring the two sides into balance with each other normally, and means connected to the said junction terminals of each bridge circuit including a summation circuit for determining the degree of balance or unbalance in said circuits.

9. The method of producing indications in an adjustable-balance two-branch pick-up circuit of defects in an article to be tested which comprises, generating a signal in said circuit, adjusting one branch of said circuit to provide a predetermined degree of unbalance in one direction, adjusting the second branch of said circuit to provide a predetermined degree of unbalance in the opposite direction and passing the article to be tested in induction relation to the pick-up circuit for relatively changing the degrees of unbalance responsive to defects in the article.

10. In the non-destructive testing of metal articles the method of obtaining indications of defects in such articles from an electromagnetic circuit having two adjustable-balance branches sensitive to phase shift which comprises unbalancing the branches in opposite directions while maintaining balance of the circuit as a whole, bringing an article to be tested into induction relation to the circuit and observing any resultant change in overall circuit balance to obtain an indication of a defect in the article shifting phase of current through the circuit.

CECIL FARROW.

REFERENCES CITED

The following references are of record in the file of this patent:

UNITED STATES PATENTS

| Number | Name | Date |
| --- | --- | --- |
| 2,124,577 | Knerr | July 26, 1938 |
| 2,098,991 | Zuschlag | Nov. 16, 1937 |

---

Certificate of Correction

Patent No. 2,434,203. January 6, 1948.

CECIL FARROW

It is hereby certified that errors appear in the printed specification of the above numbered patent requiring correction as follows: Column 5, line 22 for the word "an" read *as*; column 7, line 2, for "extension" read *extensive*; column 8, line 14, strike out "between"; line 44, before the word "containing" insert *each*; and that the said Letters Patent should be read with these corrections therein that the same may conform to the record of the case in the Patent Office.

Signed and sealed this 30th day of March, A. D. 1948.

[SEAL]

THOMAS F. MURPHY,
*Assistant Commissioner of Patents.* degree of balance to be obtained, and means connected to the terminals of said bridge circuits to indicate the degree of balance, said reactive components of said bridge circuit being sensitive to phase shift to change the degree of balance upon a shift in phase in said signal.

8. Apparatus for non-destructive testing of metallic articles comprising a signal generating circuit including a primary circuit, a pickup circuit inductively coupled to said primary circuit and including a pair of serially connected secondary coils adapted to have an article under test to be placed in proximity thereto to affect the pickup of signal in said coils, a pair of discrete circuits each connected to the high potential ends of said coils and in parallel to each other, the point of serial connection of said coils being grounded, each of said circuits having capacity and resistance elements on either side of a junction terminal whereby it constitutes together with said secondary coils a bridge circuit comprising serially connected inductance, capacity and resistance on each side of the bridge, said capacity and resistance in at least one side of the bridge being adjustable to bring the two sides into balance with each other normally, and means connected to the said junction terminals of each bridge circuit including a summation circuit for determining the degree of balance or unbalance in said circuits.

9. The method of producing indications in an adjustable-balance two-branch pick-up circuit of defects in an article to be tested which comprises, generating a signal in said circuit, adjusting one branch of said circuit to provide a predetermined degree of unbalance in one direction, adjusting the second branch of said circuit to provide a predetermined degree of unbalance in the opposite direction and passing the article to be tested in induction relation to the pick-up circuit for relatively changing the degrees of unbalance responsive to defects in the article.

10. In the non-destructive testing of metal articles the method of obtaining indications of defects in such articles from an electromagnetic circuit having two adjustable-balance branches sensitive to phase shift which comprises unbalancing the branches in opposite directions while maintaining balance of the circuit as a whole, bringing an article to be tested into induction relation to the circuit and observing any resultant change in overall circuit balance to obtain an indication of a defect in the article shifting phase of current through the circuit.

CECIL FARROW.

REFERENCES CITED

The following references are of record in the file of this patent:

UNITED STATES PATENTS

| Number | Name | Date |
|--------|------|------|
| 2,124,577 | Knerr | July 26, 1938 |
| 2,098,991 | Zuschlag | Nov. 16, 1937 |

---

Certificate of Correction

Patent No. 2,434,203.  January 6, 1948.

CECIL FARROW

It is hereby certified that errors appear in the printed specification of the above numbered patent requiring correction as follows: Column 5, line 22 for the word "an" read *as*; column 7, line 2, for "extension" read *extensive*; column 8, line 14, strike out "between"; line 44, before the word "containing" insert *each*; and that the said Letters Patent should be read with these corrections therein that the same may conform to the record of the case in the Patent Office.

Signed and sealed this 30th day of March, A. D. 1948.

[SEAL]

THOMAS F. MURPHY,
*Assistant Commissioner of Patents.*